March 7, 1950      L. D. OVERLAND      2,500,006
FROZEN CONFECTION MOLDING APPARATUS
Filed Sept. 12, 1944
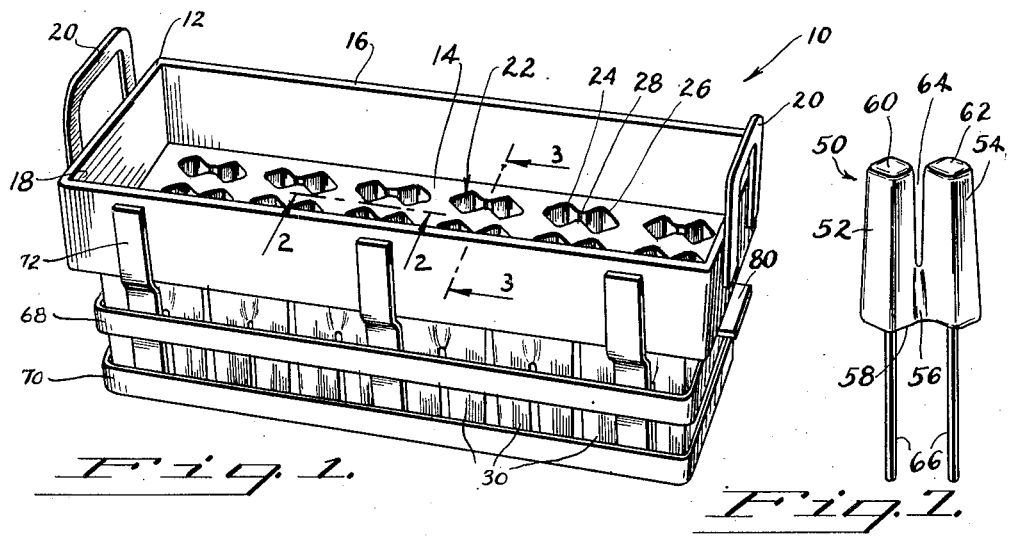
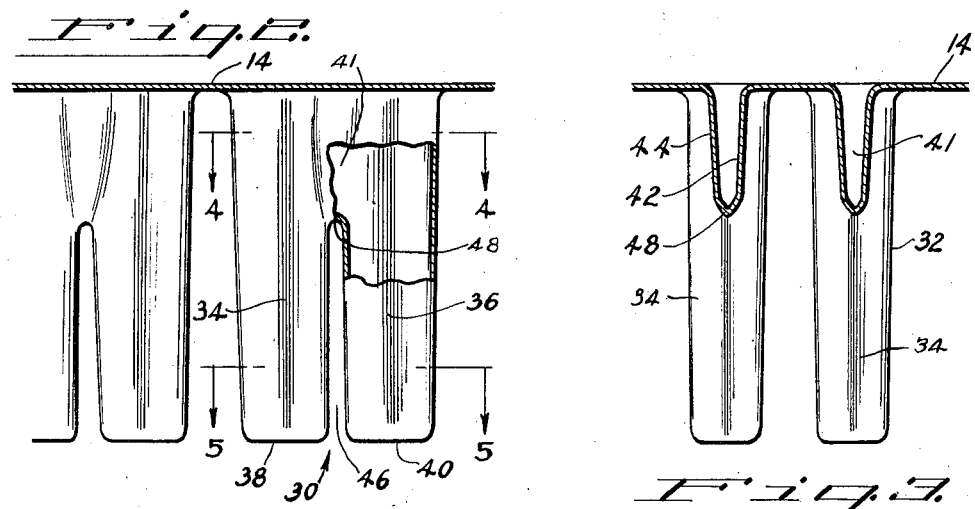
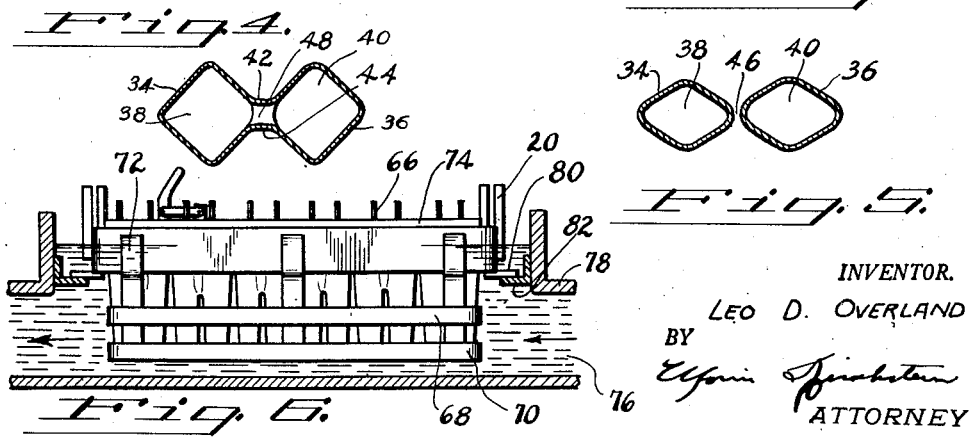
INVENTOR.
LEO D. OVERLAND
BY
ATTORNEY.

Patented Mar. 7, 1950

2,500,006

UNITED STATES PATENT OFFICE 2,500,006

FROZEN CONFECTION MOLDING APPARATUS

Leo D. Overland, Brooklyn, N. Y., assignor to Ice Cream Novelties, Inc., New York, N. Y., a corporation of New York Application September 12, 1944, Serial No. 553,705

3 Claims. (Cl. 107—19)

This invention relates to frozen confections and to an apparatus for molding the same. More particularly, the invention pertains to a mold and frozen confection formed thereby, characterized in that the frozen confection includes a plurality of juxtaposed sections joined by an integral constricted portion whereby the sections may be broken apart along a predetermined line of cleavage to form separate comestible articles which can be individually consumed.

It is an object of the invention to provide an apparatus of the character described which will freeze and defrost frozen confections more rapidly than heretofore.

Another object of the invention is to produce a frozen confection of the character described which can be broken apart more easily than similar confections now marketed and with less likelihood of damaging the separated sections.

A further object of the invention is to produce a frozen confection of the character described which can be broken apart in a sanitary manner without handling the comestible sections.

Other objects of the invention will in part be obvious and in part hereinafter pointed out.

The invention accordingly consists in the features of construction, combinations of elements, and arrangement of parts which will be exemplified in the construction hereinafter described and of which the scope of application will be indicated in the appended claims.

In the accompanying drawings, in which is shown one of the various possible embodiments of this invention, Fig. 1 is a perspective view of a multiple cavity mold embodying my invention;

Figs. 2 and 3 are enlarged fragmentary longitudinal and transverse sectional views therethrough taken substantially along the lines 2—2 and 3—3, respectively, of Fig. 1;

Figs. 4 and 5 are sectional views taken substantially along the lines 4—4 and 5—5, respectively, of Fig. 2;

Fig. 6 is a longitudinal sectional view through a freezing tank in which the multiple cavity mold is placed during a phase of its use; and Fig. 7 is a perspective view of a frozen confection made in said mold, and likewise embodying my invention.

In general, I carry out the various objects of the invention by providing a multiple cavity mold in which each of the individual mold cavities comprises a plurality of juxtaposed, substantially parallel elongated mold sections, pairs of which are joined by a constricted passageway extending from the mouths of the sections only part of the way toward the bases thereof, so that the bases of the sections are separate, i. e., unconnected and spaced apart. A mold of this shape will form a frozen confection comprising a plurality of juxtaposed, substantially parallel, elongated edible sections, pairs of which are interconnected by narrow edible waists adjacent one pair of ends thereof and are separate at the other ends.

Referring now in detail to the drawings, I have there shown a multiple cavity mold 10 comprising a sheet metal tray 12 including a bottom wall 14 and high side and end walls 16, 18. Conventional strip iron manipulating handles 20 are suitably secured to the tray, as by soldering or spot welding.

The bottom wall 14 of the tray has a plurality of through apertures 22 provided therein. These apertures are characterized by the inclusion of two or more main openings 24, 26, pairs of which are mutually interconnected by a constricted opening, i. e., an opening whose width or dimension transverse to a line joining the centers of the two main openings is less than the corresponding dimensions of said main openings. The configuration of the main and constricted openings and the relative disposition thereof may be considerably varied from that shown in order to secure any desired outline. For example, I have illustrated the main openings 24, 26 as being diamond shaped with rounded corners, and the constricted opening 28 as being in the form of a slot joining adjacent corners of the diamonds and having straight sides. Alternatively the diamonds might be of circular or any other configuration and the slots might join flats rather than corners, or be curved, or even eliminated altogether by having the main openings 24, 26 partially merge. Likewise, the number of main and constricted openings could be increased. Thus, the pair of main openings 24, 26 could be connected by two or more constricted openings, or a larger number of main openings might be provided. These main openings could be joined by radial constricted openings or by constricted openings which, with the main openings, define an enclosed space.

The number and relative arrangement of the apertures 22 is governed by the demands of the trade, and in the instant embodiment of the invention, I have shown four longitudinal rows of apertures arranged in six transverse rows so that, in all, twenty-four apertures are provided.

Each of the apertures has associated therewith an individual sheet metal container mold 30 which is open at the top, where it is permanently and rigidly secured, as by welding or soldering, to the bottom mold wall 14 around and in registration with the aperture 22. Said individual molds are closed at their bottoms in the conventional manner of mold containers in this field.

The individual container molds are provided with sloping side walls 32, in order that the frozen confections may be withdrawn easily after defrosting. Each individual mold 30 includes two elongated, finger-like, juxtaposed, substantially parallel mold sections 34, 36, the open mouth of each section being registered with one of the main openings 24, 26. The base of each of said sections 34, 36 is closed by an integral bottom wall 38, 40. The two sections 34, 36 are joined by a constricted passageway 41 defined by side walls 42, 44. Said side walls are secured to the edges of the slot 28 and extend from said slot part of the way down (less than half) the sides of the sections, stopping considerably short of the bottom walls 38, 40 thereof, thereby leaving a long clear space 46 between the adjacent walls of said sections, this space extending from the bases of the sections a considerable distance toward the bottom mold wall 14. The passageway side walls 42, 44 converge downwardly to the passageway base wall 48 to facilitate withdrawal of confections.

A frozen confection 50 (Fig. 7) formed in an individual container mold 30 such as described will consist of two elongated, juxtaposed, substantially parallel finger sections 52, 54 which are integrally joined by a narrow waist, web or constricted portion 56 negatively matching the configuration of the constricted passageway 41. This web runs from the bottom 58 of the frozen confection toward the tips 60, 62 thereof, but stops considerably short of said tips to leave a clear space 64 which extends over half the length of said finger sections from the tips downwardly. A handle stick 66 may be imbedded in each finger 52, 54.

This construction of frozen confection permits the several sections to be broken apart very easily and without placing much pressure on the sections, as would be the case if the web integrally joined the finger sections all the way from the bases to the tips thereof.

This pressure is so relatively small that it may be developed simply by spreading the handle sticks 66 manually apart. It will be appreciated that such construction renders unnecessary manual gripping of the comestible sections to break the same apart which has heretofore been the highly unsanitary but only way of separating said sections.

Suitable means may be provided to protect the depending finger-like mold sections 38, 40. Such means comprises a vertically registered set of rectangular guard rails 68, 70 surrounding all the individual molds near the bases thereof and held in position by legs 72 suitably secured to the side walls 16 of the mold 10.

The mold 10 may be used in conventional manner. For example, the individual container molds 30 are filled with a comestible fluid and a vertically disposed handle stick 66 partially inserted in each of the finger sections 38, 40. These sticks may be held in place by a standard multiple stick holder 74. The mold 10 is then placed in a brine bath 76 contained in a brine tank 78. Flanges 80 extending from the mold rest on channel rails 82 secured to the walls of the tank 78. The mold is left in the brine bath long enough to freeze the fluid contained therein. Conventionally, the brine bath is large enough to take more than one mold 10 and the molds are so arranged therein that the brine will flow longitudinally of the mold in the direction indicated by the arrows A in Fig. 6.

Attention is called to the fact that with the construction of the individual cavity molds 30 above described and with the brine flowing longitudinally of the mold 10, I am able to effect freezing of fluid much more rapidly than heretofore. In previous molds, the finger sections 38, 40 were joined integrally throughout their entire length. As a result, brine did not surround the entire periphery of each finger above its tip, as it does in my improved mold, to give a larger heat exchange surface. Furthermore, heretofore the flow of brine longitudinally of the mold left a stagnant space between the two fully joined finger sections. In the mold construction shown herein, the clear space 46 breaks up stagnation of the brine between the finger sections and encourages transverse circulation between said sections, thus causing fresh cold brine to constantly sweep over and scrub against the entire external surface of the sections 38, 40 from the end of the passageway to the tips of the sections. It will be appreciated that such action reduces the thickness of the dead film of brine on the external surface of the mold and greatly increases heat exchange.

In practice, I have found that the presence of the clear spaces 46 has reduced the freezing time by as much as $33\frac{1}{3}\%$. This raises the output for the equipment, thereby appreciably reducing the manufacturing cost of the frozen confections.

To defrost the mold, the same is placed in a tank similar to the tank 78, but containing warm water flowing in the same direction as the brine. I have likewise found that for the reasons as outlined above with respect to the freezing, the defrosting time is reduced by as much as $33\frac{1}{3}\%$, thus further reducing the manufacturing cost of the frozen confections.

It may be mentioned that although I have described handle sticks 66 specifically in conjunction with the practice of a method of employing my improved mold, said mold may be used with other types of handles, for example, loop or bail handles, or even with no handles at all, some suitable lifting means such as a peg being used in this case to facilitate removal of a frozen confection from the mold.

It will thus be seen that I have provided an improved frozen confection and apparatus for molding the same, which achieve the several objects of this invention and are well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A multiple cavity mold for forming and freezing a plurality of edible handled frozen confections, said mold comprising a base plate having a plurality of through apertures therein, each of said apertures comprising a pair only of adjacent large main openings interconnected by a narrow opening in said plate, a plurality of individual container molds, one associated with each of said apertures, each of said container molds including only two downwardly elongated, substantially parallel, juxtaposed hollow finger sections, the bases of said sections being closed and the tops of said sections being open, the open tops of said sections being in registration and co-extensive with the two main openings, means to join the open tops of said sections to said base plate, each container mold including means providing a narrow downwardly elongated passageway interconnecting the finger sections, said passageway having a closed bottom and open top, the open top of said passageway being in registration and co-extensive with the narrow opening interconnecting the two main openings, means to join the open top of said passageway to said base plate, said narrow passageway extending less than half the way from said base plate to the bases of the finger sections, the remainder of said sections being separated by a clear space so as to leave the bases of the sections separate, said container molds being arranged with the lines joining the centers of the finger sections parallel and being adapted to have a heat exchange fluid circulated past said mold in a direction parallel to said lines.

2. A multiple cavity mold as set forth in claim 1 wherein the pairs of adjacent large openings and the transverse cross-sections of the finger sections are polygonal and so arranged that a line joining the centers of a pair of sections and openings passes through the apex of each opening and section which is closest to the other opening and section, the narrow passageway and narrow opening joining said apices.

3. A multiple cavity mold as set forth in claim 1 wherein the pairs of adjacent large openings and the transverse cross-sections of the finger sections have the shape of a parallelogram and are so arranged that a line joining the centers of a pair of sections and openings pass through the apex of each opening and section which is closest to the other opening and section, the narrow passageway and narrow opening joining said apices.

LEO D. OVERLAND.

REFERENCES CITED

The following references are of record in the file of this patent:

UNITED STATES PATENTS

| Number | Name | Date |
| --- | --- | --- |
| D. 92,987 | Thomas | Aug. 7, 1934 |
| 695,907 | Buckingham | Mar. 25, 1902 |
| 1,407,614 | Wicks | Feb. 21, 1922 |
| 1,965,292 | Krick | July 3, 1934 |
| 2,003,612 | Schnaier | June 4, 1935 |
| 2,045,730 | Schepman | June 30, 1936 |
| 2,076,208 | Richter | Apr. 6, 1937 |
| 2,080,816 | Grunwald | May 18, 1937 |
| 2,176,408 | Peterson | Oct. 17, 1939 |
| 2,243,363 | Thomas | May 27, 1941 |